(12) United States Patent
Larsen

(10) Patent No.: US 6,372,134 B1
(45) Date of Patent: Apr. 16, 2002

(54) CLEANING DEVICE FOR REMOVING OIL

(76) Inventor: Bent Larsen, Wallgreninkatu 22, FIN-06100 Porvoo (FI)

( * ) Notice: Subject to any disclaimer, the term of this patent is extended or adjusted under 35 U.S.C. 154(b) by 0 days.

(21) Appl. No.: 09/485,486

(22) PCT Filed: Jun. 9, 1999

(86) PCT No.: PCT/FI99/00503

§ 371 Date: Feb. 11, 2000

§ 102(e) Date: Feb. 11, 2000

(87) PCT Pub. No.: WO99/64683

PCT Pub. Date: Dec. 16, 1999

(30) Foreign Application Priority Data

Jun. 11, 1998 (FI) .................................................. 981345

(51) Int. Cl.⁷ .............................................. E02B 15/04
(52) U.S. Cl. ................ 210/242.3; 210/159; 210/242.4; 210/400; 210/776; 210/923; 210/924; 15/256.5
(58) Field of Search .............................. 210/159, 242.3, 210/242.4, 400, 503, 693, 776, 791, 923, 924; 15/21.1, 22.3, 48, 256.5, 256.6

(56) References Cited

U.S. PATENT DOCUMENTS

| | | | |
|---|---|---|---|
| 3,617,555 A | 11/1971 | Ginsburgh et al. | 210/671 |
| 3,744,638 A | 7/1973 | Rhodes | 210/242.4 |
| 4,555,338 A | * 11/1985 | Marchionda | 210/242.4 |
| 4,834,880 A | * 5/1989 | Lundin | 210/242.3 |

FOREIGN PATENT DOCUMENTS

| | | |
|---|---|---|
| FI | 57996 | 7/1980 |
| NO | 154097 | 4/1986 |

* cited by examiner

*Primary Examiner*—Mark Spisich
(74) *Attorney, Agent, or Firm*—Young & Thompson

(57) ABSTRACT

A cleaning device (1), which is attached to a collecting device comprising a body and wheels (3) in which device a V-shaped brush (2) secured to a belt (7) moves in a groove, whereby the brushes flatten between the trough walls of the cleaning device (1) and a plough captures the detached oil, which drains into an oil receptacle (5). Moreover, a fork (6) for removing brash ice and debris can be mounted in front of the cleaning device (1).

3 Claims, 4 Drawing Sheets

Figure 2A:
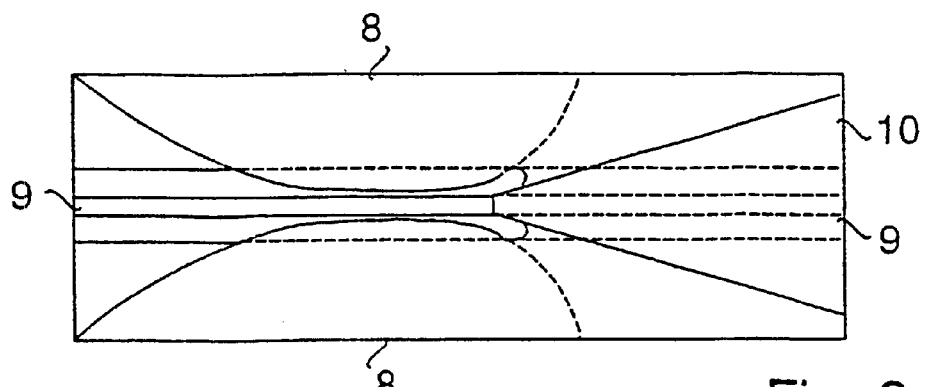

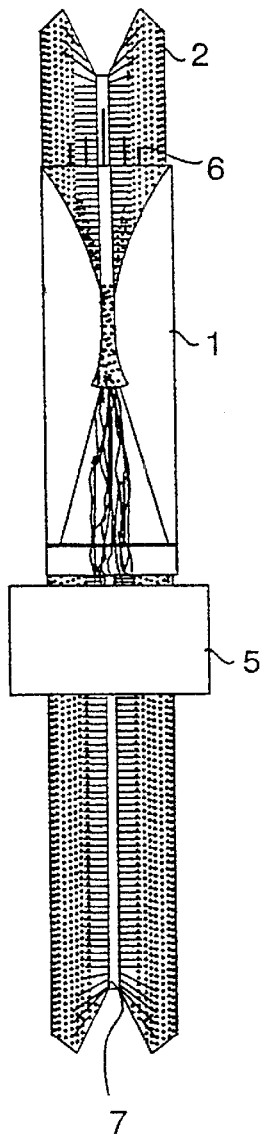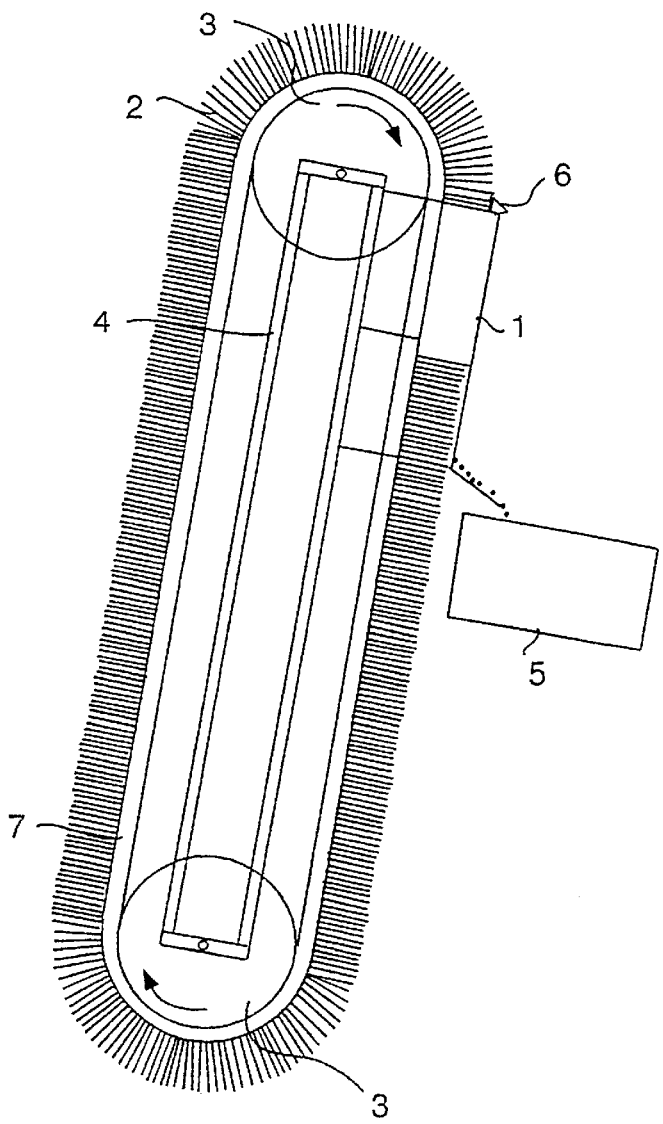
Fig. 1a
Fig. 1b

CLEANING DEVICE FOR REMOVING OIL

The present invention relates to a cleaning device, through which brush rows collecting oil or the like move, and which comprises means for recovering oil from the brush rows.

The invention relates to removing oil or other similar substances from brushes. Previously known is a cleaning device which cleans bristles of the brush from oil. While the brushes move, teeth of the cleaning device rake out the bristle rows. A cleaning device of this type is proved to be good when collecting heavy fuel oils, since material which adheres to a bristle tuft is easily picked up with the brush. Instead, when collecting light oils, such as fuel oil or the like, the raking cleaning device has not proved to be a good solution. A reason for this is that thinner bristles have to be used in the brush row when light oil is collected. To achieve a satisfactory collecting capacity, thin bristles have to be added in the brush row to the extent that bristle tufts grow considerably in volume at the tips. A thick tufted bristle row does not pass smoothly between the tooth gaps of the cleaning device, but the gaps have to be widened. As a result of widening, the teeth will no longer rake out the bristles properly. Thus, despite the great number of bristles, the collecting capacity reduces next to nothing, since no proper raking can be provided. The problem has come up among the professionals when handling light fuel oils.

The object of the present invention is tb solve the above-described problem and to provide a cleaning device which is more efficient than previous ones and which is also applicable for recovering light oils, such as fuel oil. This is achieved with a cleaning device of the invention, which is characterized in that the brush rows are arranged in a V formation, and that the cleaning device comprises:—troughs arranged on the opposite sides of the brush rows arranged in the V formation, against the walls of which troughs the brush rows, which are inclined away from one another, flatten when they are driven between the troughs, and—a plough arranged in a space between the brush rows, which plough captures the oil.

In accordance with the invention, the cleaning device can be constructed such that the brush rows inclining away from one another are attached to a belt or the like. Oil or the like is removed from bristles arranged in a V form by flattening said bristles. The structure of the cleaning device mainly comprises a bottom plate having a groove for the belt, two opposing troughs attached to the bottom plate and a plough attached to the trough top. In shape, the trough can be a crescentic, curved structure, which has a pointed front, which becomes broader in the middle and which tapers again in the rear.

A wall of the trough can be partly inwardly inclined. The front of the triangular, tapering plough, which is secured to the cover of the troughs at two walls, is designed to follow the shape of the bending brushes. The opening of the plough front can have various shapes depending on the length of the brush rows and the distance between the brush roots. The walls curving into the opening make it possible that the plough thoroughly captures the removed oil from the empty space between the bristles and will not allow the brush rows to transfer the oil together with the brush when said brush proceeds from between the troughs. The width of the plough has to be such that when coming out of the cleaning device, the brush rows can smoothly pass by the plough. The structure of the belt groove has to be such that debris that possibly adheres to the belt is removed and the brush rows can smoothly pass through the cleaning device.

The oil is removed from the bristles in such a manner that the V-shaped brush rows attached to the belt are driven between the troughs from the front such that while the belt proceeds in the groove, the bristles of the brush rows move along the wall of a row-specific trough, whereby the bristle tufts flatten against the trough walls and the oil detaches from the bristles. The inclining walls make the flattened bristle tufts bend into an arch, whereby an empty space is formed therebetween. The oil removed from the bristles drains into the empty space, wherefrom the plough captures it. After passing the narrow portion of the cleaning device, the brush rows spread out again into the V form. Thanks to the V formation, the brush rows pass the plough smoothly and leave the trough tops in order to collect new oil. The trough covers and the rear portion of the plough join such that their ends join and the oil passes into an oil receptacle. Thus all the oil removed from the bristles is accumulated at one point. By positioning the brush rows in the V formation, it is possible to provide an efficient and smoothly operating brush, which is compatible with the cleaning device of the invention. In this cleaning method, the thickness of the bristle tufts is not of importance, but the method enables increasing the tuft to the extent that the collecting system meets the current requirements for capacity. It is to be borne in mind that density of oil has to be determined on the basis of viscosity-and oil temperature. Therefore, said light oil does not necessarily refer to light fuel oil but oils in general with lower viscosity. In front of the troughs, it is possible to construct a fork or the like for removing brash ice and debris. If a plurality of belt rows are desired, the cleaning devices can be mounted in parallel. The structure or structures of the brushes or brush rows, as well as V-shaped brush rows, can be of various types. In place of the described troughs, there can be troughs of another type, through which the V-shaped brush rows can move.

The preferred embodiments according to the invention are disclosed in the attached dependent claims 2 to 3.

Figure 2B:
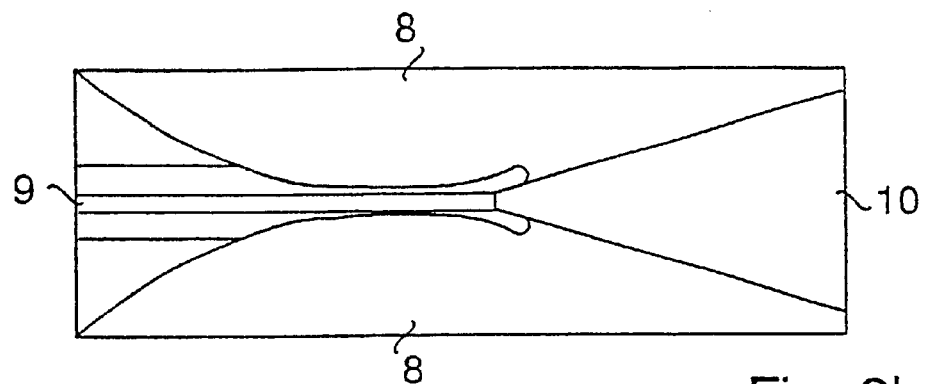
Figure 2C:
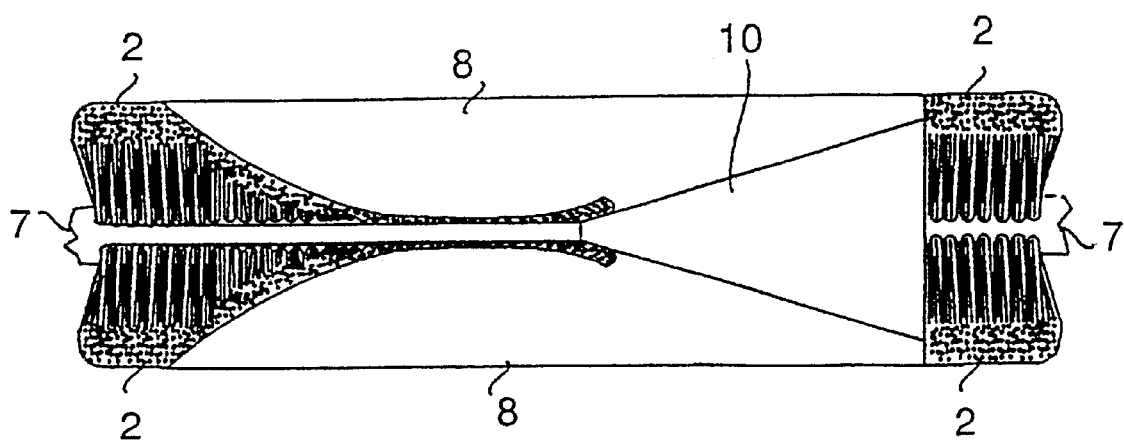
Figure 3A:
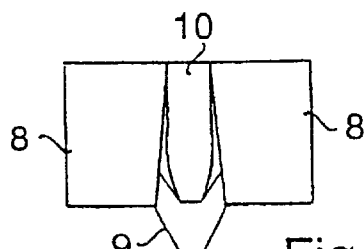
Figure 3B:
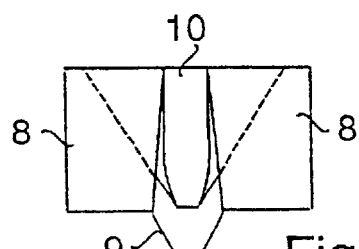
Figure 3C:
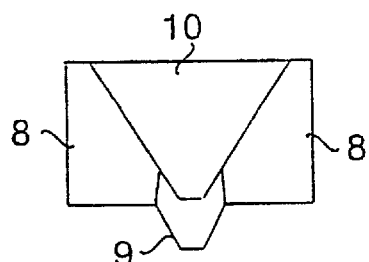
Figure 3D:
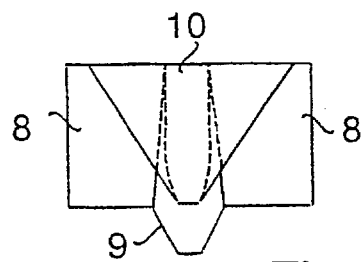
Figure 3E:
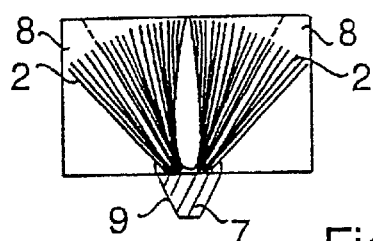
Figure 3F:
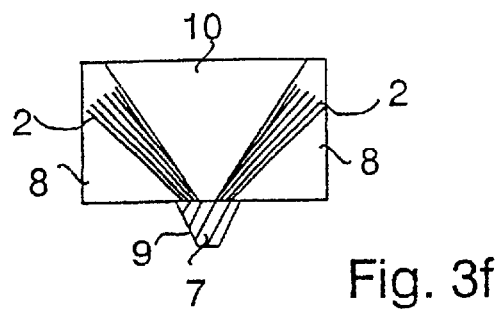
Figure 4A:
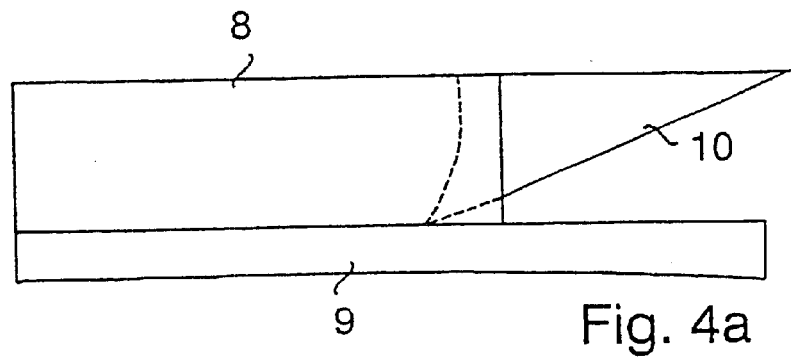
Figure 4B:
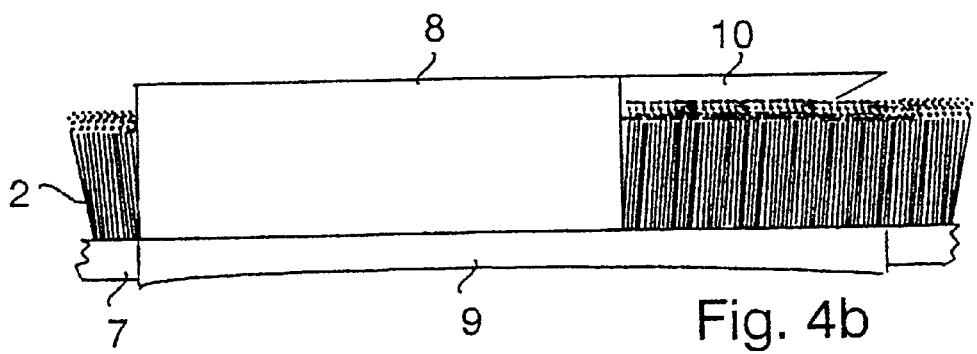
Figure 4C:
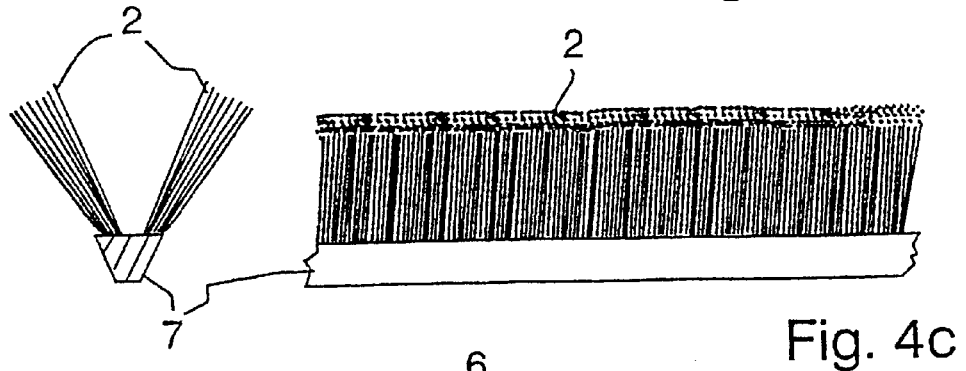
Figure 4D:
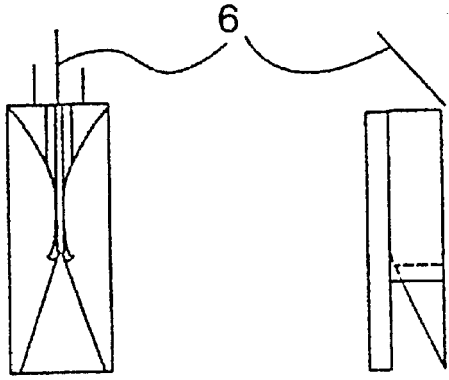

In the following, the invention will be described by way of example with reference to the accompanying drawings, wherein FIGS. 1a and 1b show a cleaning device mounted on a collecting system, FIGS. 2a to 2c are top views of the cleaning device and a V-shaped brush, FIGS. 3a to 3f are front and back views of the V-shaped brush of the cleaning device, FIGS. 4a to 4d show a side view of the cleaning device and the structure of the V-shaped brush.

FIGS. 1a and 1b show a cleaning device mounted on a collecting system. The collecting system comprises an endless belt 7, to which bristles are attached to provide a V-shaped brush 2. The belt 7 and along therewith the brush 2 move about wheels 3.

When the collecting system is used for removing oil from water, for instance, it is possible to arrange the lower wheel 3 completely under the surface of water. Thus oil adheres to the brush 2, when the brush along with the belt 7 travels under the surface of water at the wheel 3. Thereafter, the oil adhering to the brush 2 is picked up with the brush to the cleaning device 1, where the oil is removed from the brush and applied into an oil receptacle 5.

FIGS. 1a and 1b further show a fork 6 arranged prior to the cleaning device 1 in the direction of motion of the bristles. Said fork prevents debris, brash ice or the like from travelling along with the brush 2 from the surface of water into the cleaning device 1, where it could cause blocking.

FIGS. 2a to 2c are top views of the cleaning device and the V-shaped brush, and FIGS. 3a to 3f show the cleaning device from the front and back of the V-shaped brush. The V-shaped brush rows attached to the belt 7 are driven into the cleaning device 1 from the front. The front of the cleaning device is on the left in FIGS. 2a to 2c. The belt 7 moves through the cleaning device 1 along a groove 9 arranged in the cleaning device 1.

When entering the cleaning device, the brush rows 2 come into contact with walls of troughs 8 in the cleaning device. Thanks to the design of the trough 8 walls, the bristles flatten against the trough 8 walls, when the brush rows move inside the cleaning device 1. Moreover, the trough 8 walls are inclined such that the flattened bristles bend into an arch, whereby an empty space is formed therebetween. The oil detached from the bristles drains into said empty space. In accordance with the invention, a plough 10, which captures the oil drained between the bristles, is arranged in the cleaning device 1.

After passing the narrowest point of the cleaning device 1, the bristies spread out again into the V formation. Thanks to said V formation, the brushes 2 pass the plough 10 smoothly, whereafter they leave behind the trough 8 tops and come out of the cleaning device 1.

FIGS. 4a to 4d show a side view of the cleaning device and the structure of the V-shaped brush. The cleaning device 1 mainly comprises a base plate having a belt groove 9, along which the belt 7 and the brushes move through the cleaning device 1. Two troughs 8 or the like are attached to the base plate and a plough is attached to the top of the troughs.

It is to be understood that. the above description and the figures related thereto are only intended to illustrate the present invention. It is obvious to the person skilled in the art that the invention can be varied and modified in a variety of ways without deviating from the spirit and scope of the invention disclosed in the appended claims.

What is claimed is:

1. A cleaning device (1), through which brush rows collecting oil or the like move, and which comprises means for recovering oil from the brush rows, characterized in that the brush rows (2) are arranged in a V formation, and that the cleaning device comprises:

troughs (8) arranged on the opposite sides of the brush rows (2) arranged in the V formation, against the walls of which troughs the brush rows, which are inclined away from one another, flatten when they are driven between the troughs (8), and a plough (10) arranged in a space between the brush rows (2), which plough captures the oil.

2. A cleaning device as claimed in claim 1, characterized in that the trough (8) walls are partly inwardly inclined, and that the brush rows (2) inclining away from one another are attached to a belt (7).

3. A cleaning device as claimed in claim 1, characterized in that the brushes of the brush rows are bent into an arcuate shape when they are driven between the troughs (8), and the front portion of the plough (10) has an arcuate shape which corresponds to the shape of the bent brushes.

\* \* \* \* \*